United States Patent [19]

Hrovat et al.

[11] 4,017,567
[45] Apr. 12, 1977

[54] PROCESS FOR THE PRODUCTION OF BLOCK FUEL ELEMENTS FOR GAS COOLED HIGH TEMPERATURE POWER REACTOR

[75] Inventors: Milan Hrovat, Rodenbach; Willi Wolff, Kahl; Karl-Gerhard Hackstein, Hanau, all of Germany

[73] Assignee: Nukem G.m.b.H., Hanau, Germany

[22] Filed: May 13, 1975

[21] Appl. No.: 577,054

Related U.S. Application Data

[63] Continuation of Ser. No. 218,244, Jan. 17, 1972, abandoned.

[30] Foreign Application Priority Data

Jan. 30, 1971 Germany .......................... 2104431

[52] U.S. Cl. ...................................... 264/.5; 176/84
[51] Int. Cl.² .......................................... G21C 21/00
[58] Field of Search ................... 264/.5; 176/84

[56] References Cited

UNITED STATES PATENTS

| | | |
|---|---|---|
| 3,011,960 | 12/1961 | Williams ............................... 264/.5 |
| 3,236,921 | 2/1966 | Seimon .................................. 264/.5 |
| 3,612,428 | 11/1971 | David ................................ 264/.5 X |
| 3,644,604 | 2/1972 | Hooker .................................. 264/.5 |
| 3,652,744 | 3/1972 | Dahlberg ............................... 264/.5 |
| 3,723,581 | 3/1973 | Boettcher et al. .................... 264/.5 |
| 3,758,648 | 9/1973 | Sturge .................................. 264/.5 |
| 3,773,867 | 11/1973 | Williams et al. ...................... 264/.5 |

*Primary Examiner*—Harold Tudor
*Attorney, Agent, or Firm*—Cushman, Darby & Cushman

[57] ABSTRACT

Molded block fuel elements having an isotropic structure useful for gas cooled high temperature power reactors are prepared by first producing an isotropic graphite granulate of high density with a definite porosity from a molding powder and then hot pressing this isotropic granulate together with coated fuel particles at low pressure to isotropic fuel element. The molding powder for making the granulate is made from a mixture of natural graphite and binder resin, synthetic graphite and binder resin or a mixture of both types of graphite powder with binder resin.

11 Claims, 2 Drawing Figures

PROCESS FOR THE PRODUCTION OF BLOCK FUEL ELEMENTS FOR GAS COOLED HIGH TEMPERATURE POWER REACTOR

This is a continuation of application Ser. No. 218,244 filed Jan. 17, 1972, now abandoned.

The invention is directed to the process of producing block fuel elements for gas cooled high temperature fuel reactors.

The known block fuel elements are, for example, hexagonal prisms made of graphite and having a width over the flats of the hexagon of 360 mm and a height of 793 mm., see Docket 50267 -14(November 1969) page 3.4-1 Fort St. Vrain Nuclear Generating Station Final Safety Analysis Report. In the inside of the prism there are found in hexagonal arrangement about 320 bore holes running parallel to the longitudinal axis. Two thirds of these bore holes serve to receive the fuel containing cylinders and the remainder serves as channels for helium-cooling gas. The fuel cylinder consists of a carbon matrix in which the fuel and fertile material is embedded in the form of coated particles. The coated particles are spherical heavy metal oxide or carbide cores of several hundred microns diameter which preferably are coated several times with pyrolytically deposited carbon. In general as fuels there are used U 235, U 233 and fissionable plutonium isotopes. As fertile material there is employed thorium or uranium 238. The coating has the function of largely retaining the fission products formed in the particles. The total volume of the block fuel elements amounts to 89 liters. This is distributed as 18.5 volume percent cooling channels, 23.5 volume % fuel bore holes and 58 volume percent block graphite, which forms the fuel element structure.

Furthermore, there are known, for example, fuel elements having a width over the flats of hexagon of 383 mm. and a height of 1050 mm. (see D.F.I. Bishop. Factors Affecting the Costs of Fabricating HTR Fuel. Dragon Project Fuel Symposium Paper, October 1969). The fuel element prism has only 18 hexagonally arranged fuel holes of 63 – 70 mm. diameter in which 36 graphite containers (two per bore hole) stand one on top of the other. Between the bore holes and graphite containers there is found a 5 mm. Wide annular gap for helium gas. The graphite container is a 500 mm. long tube in which 10 annular fuel containing compacts are piled up one on the other. The compacts consist of a graphite matrix with pressed in coated fuel particles. Of the 133liters of total fuel element volume 18.5 volume % is cooling channels for helium gas, 11 volume percent is fuel compacts and 70.5 volume percent is the structural graphite. The classification clearly shows that only 23.5 or 11 percent of the fuel element volume can be filled with fuel. In contrast the structural graphite requires the largest volume portion, i.e. 58 or 70.5 percent.

In order to better utilize the fuel element volume it has been proposed to employ molded block fuel elements, Hrovat, U.S. Ser. No. 3284 filed Jan. 16, 1970, corresponding to German application P 19 02 994.8 filed Jan. 22, 1969. In contrast to the previously named types of fuel elements the molded block fuel element is a compact prism provided with cooling channels, which consist of only a homogeneous graphite matrix and coated fuel particles.

It is essential that the graphite matrix in which the coated particles are impressed simultaneously form the fuel element structure. Consequently in relation to the portion of fuel particles, a far greater fuel volume is available. Besides there is eliminated the gap acting as heat flow barrier between the fuel zone and structural graphite. Additionally, at unchanged fuel element loading, the power density in the fuel zone is strongly reduced, the heat output considerably improved and correspondingly the temperature gradient and consequently the thermal and radiation induced stress greatly reduced. Moreover, the lower stress and the improved efficiency of the prism volume permits a several fold increase of the fuel and fertile material content in the fuel element, whereby the construction of the cooling channels (volume and surface area) can be adjusted without limitation of the sides of the fuel elements to the optimum cooling conditions. The increase fuel load considerably reduces the cost of producing the fuel element and simultaneously leads to higher powder density in the reactor core and also a lower capital cost, see R.C. Dahlberg "Comparison of HTGR Fuel Cycles for Large Reactors", Oak Ridge —Symposium April 1970, Paper No. 130, Session No. VI.

The possibility of laying out the cooling channels without limitation reduces the helium pressure drop in the reactor core and accordingly the necessary pumping power for the helium cycle, which again reduces the cost of the generation of current.

Besides the graphite matrix serves as moderator, heat conductor, secondary barrier for the fission products and protects the coated particles against a damaging corrosion by impurities which are present as traces in the helium cooling gas.

A series of requirements are placed on the graphite matrix.

1. Good irradiation behavior up to temperatures of 1400° C and to neutron exposure of about $7 \times 10^{21}$ neutrons/cm$^2$ (E>o,1MeV). This requirement assumes an as much as possible high crystallinity of the isotropic graphite matrix.
2. Good thermal conductivity and an as low as possible coefficient of thermal expansion in order that entry of inadmissible thermal stresses in the block fuel element be avoided.
3. Good strength properties.
4. Good corrosion resistance Furthermore, in the production there is required a non destructive consolidation of the coated fuel particles into the graphite matrix.

The present invention avoids the technological difficulties of the known processes and permits the production of a block fuel element of any size and shape satisfying all requirements.

According to the invention there is first produced from molding powder as shown in example 1 by molding spheres in rubber molds at room temperature and at 3000 kg/cm$^2$ and comminuting these spheres an isotropic graphite granulate of high density having a definite porosity. The molding powder for the production of granulates consists of a mixture of natural graphite and binder resin, synthetic graphite and binder resin, or a mixture of both types of graphite powder with binder resin. When a mixture of natural and synthetic graphite are employed, they can be used in any proportions, e.g. 1 to 99 percent of either by weight.

The isotropic graphite granulate produced in the first step has an apparent density between 1.5 g/cm³ and 1.85 g/cm³ or as shown in example 1 even 1.9 g/cm³ and a porosity of 25 to 7.5 percent by volume. The molding pressure in the first step as shown in example 1 can be 3 t/cm² (i.e., 3 metric tons/cm²). The temperature in the first step can be room temperature.

The binder resin employed, for example, can be phenolformaldehyde, with a softening point of about 100° C but phenolformaldehyde resins with other softening temperatures between 60° and 120° C or with addition of curing agents as for example hexamethylene tetramine or other formaldehyde resins for example on xylol or cresol base or furfurylalcohol resions can be used.

The binder resin can be used in an amount of 10 to 30 percent of the graphite by weight.

For the production of the isotropic granulate according to the invention in the first step, a fine graphite powder, e.g. about 20 microns in diameter, having a high crystallinity, is molded at high pressure with a binding agent additive, preferably phenol-formaldehyde resin, in a rubber mold to isotropic spheres. Subsequently the spheres are ground to granules having an average grain diameter of about 1 mm. The degree of fineness of the starting graphite powder is so chosen that on the average each granulate grain consists of several hundred thousand or even about 1,000,000 isotropically arranged graphite particles. For the production of the molding powder any graphite, independent of particle form is suited, for example, natural graphite powder, synthetic graphite powder or a mixture of the two. In another step the coated fuel particles in a rotating drum are overcoated with a molding powder of the same composition according to a kind of dragee process. As shown in example 2 to prepare fuel elements with a free zone in a second molding step the isotropic granulate is preliminarily molded to a block. The molding pressure in this step can be 30 kg/cm², the temperature about 70° C. The cooling channels can be bored out of the block either after the molding step or can be molded simultaneously with the molding of the block fuel element.

As coated fuel particles there can be employed oxides or carbides of U 235, U 233 and fissionable plutonium isotropes a fuel materials in mixture with U 238 and/or Th 232 as fertile materials coated with multiple layers of pyrolytic carbon prepared in conventional manner. Conventional intermediate layers for example of SiC, ZrC or NbC can also be present in the coated fuel particles. The intermediate layers can be emitted.

To further illustrate the invention there are provided drawings wherein

Figure 1:
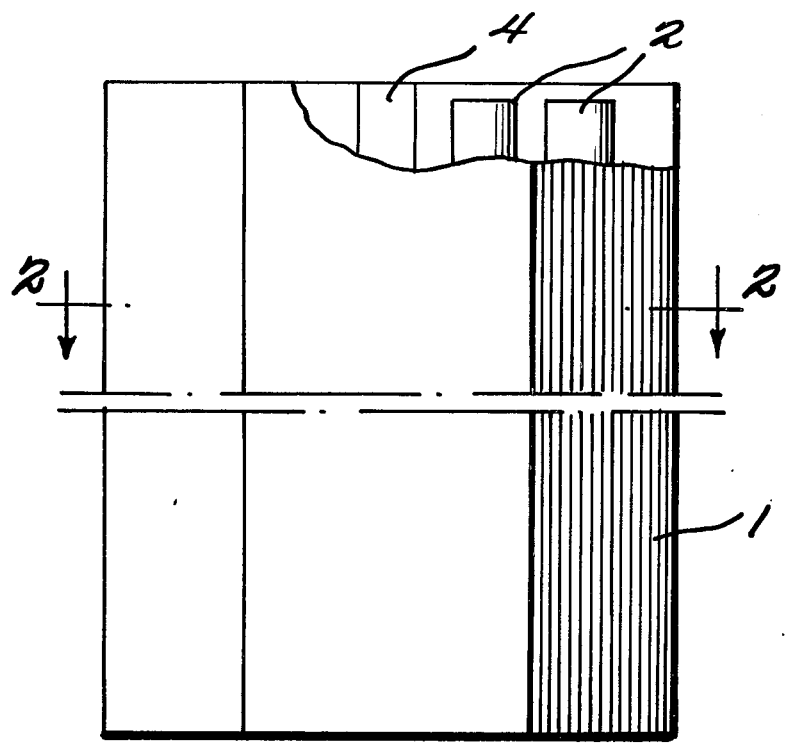
FIG. 1 is a vertical view partially broken away of a block fuel element.
Figure 2:
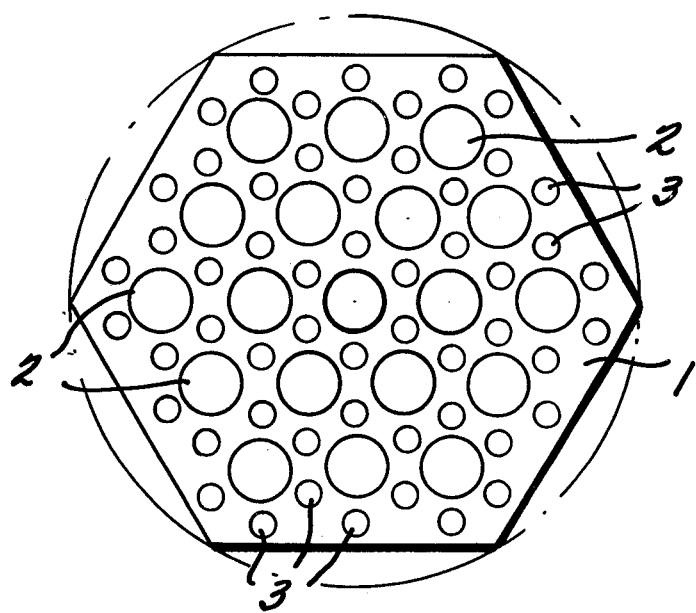
FIG. 2 is a sectional view taken along the line 2—2 of FIG. 1.

Referring more specifically to the drawings the block fuel element 1 consists of a hexagonal prism made from graphite which contains the 18 fuel zones 2 made of a mixture of graphite and coated particles. Furthermore, there are provided 54 cooling channels 3 and a central loading channel 4.

The cooling channels can be molded simultaneously with the molding of the block fuel element in order to avoid an inadmissible pressure build up of the cracking products inside the block in the carbonization. For this purpose corresponding metal rods are pressed in and are then removed after the molding. To carbonize the binder the fuel element is calcined in a nitrogen stream up to 800° C. To balance the dimensional changes of the fuel containing zones with the fuel free zones during the carbonization there the degree of condensation of the phenol formaldehyde resin used for encasing is increased. This is obtained by the addition of small amounts of hexamethylene tetramine to the binder resin.

To further explain the invention there are set forth several examples.

Unless otherwise indicated, all parts and percentages are by weight.

EXAMPLE 1

The Production Of A Cylinder Of Isotropic Granulate Without Fuel

A molding powder was produced from a mixture of 60 weight percent natural graphite powder "FP", 20 weight percent graphitized petroleum coke powder and 20 weight percent of "1949 resin binder" dissolved as a 40 percent solution in methanol by kneading, drying and grinding. The FP powder is a nuclear pure natural graphite having an ash content of 200 ppm., an average particle diameter of 20 microns and a high crystallinity (crystal size $L_c$ = 1000A). The graphitized petroleum coke is a needle coke graphitized at 3000° C. having an extremely low ash content (ash less than 10 ppm), an average particle diameter of 20 microns and a crystal size $L_c$ of 500 A. The 1949 binder is a phenol formaldehyde resin having a high degree of condensation (softening point of 100° C., molecular weight 700), which remains stable without change in properties while molding at 150° C.

Spheres having a diameter of 62 mm. and a density of 1.9 g/cm³ were prepared by molding the molding powder in rubber molds at room temperature and a pressure of 3 t/cm² (t being metric tons). In spite of the platelet shaped particles of the natural graphite powder, the molding in the rubber molds permitted the formation of an isotropic consolidation. The anisotropic factor of the thermal expansion measured on the spheres was only $\alpha \perp \alpha \parallel = 1.1$.

The isotropic granules used having a particle diameter of $3.15 > d > 0.315$ mm were obtained by comminuting the graphite spheres and subsequently sieving. Cylinders were molded from the isotropic granules at 150° C. in steel dies. At a green density of 1.8 g/cm² the required molding pressure was only 60 kg/cm². The pellets were carbonized in an inert gas stream and finally calcined in a vacuum at 1800° C.

The following table sets forth the properties of the matrices produced from isotropic granules and from molding powder

Table

| Graphite Matrix | | From Isotropic Granules | From Molding Powder |
|---|---|---|---|
| Bulk Density (g/cm³) | | 1.76 | 1.65 |
| Specific electric resistance | $\parallel$ | 1.39 | 1.18 |
| (Ohm × cm) × 10⁻³ | $\perp$ | 1.97 | 3.40 |
| Ultimate Flexural strength | $\parallel$ | 160 | 300 |
| (kg/cm²) | $\perp$ | 120 | 150 |
| Thermal conductivity | $\parallel$ | 0.16 | 0.18 |
| at 20° C. (cal/cm sec. ° C) | $\perp$ | 0.13 | 0.07 |

Table-continued

| Graphite Matrix | | From Isotropic Granules | From Molding Powder |
|---|---|---|---|
| Linear thermal expansion ($10^{-6}/°C.$) | ∥ | 2.15 | 1.6 |
| | ⊥ | 3.21 | 5.6 |
| Anisotropic factor of the thermal expansion | | 1.49 | 3.5 |

∥ = parallel to the grain orientation

⊥ = right angle to the grain orientation

The table clearly shows that according to the invention all properties of the graphite matrix in regard to isotropy are improved considerably. This follows most clearly from the anisotropic factor which is reduced from 3.5 to 1.49. Therewith the invention even permits the molding of quasi isotropic and homogeneous cylinders from a natural graphite powder having the advantage of high crystallinity with extremely unfavorable platelet shaped grains.

EXAMPLE 2

The Production of Block Elements

The isotropic granules were produced as in example 1. In the comminution of the spheres and the subsequent sieving about 30 weight percent were below the desired particle size ($d < 0.31$ mm), which were returned to the molding powder and the mixture again molded to spheres. A cylinder having a diameter of 240 mm and a height of 450 mm was preliminary molded from the isotropic granulate at 70° C. and a pressure of about 30 kg/cm². There were pressed into the inside of the cylinder parallel to the longitudinal axis in a hexagonal arrangement 19 metal tubes having diameters of 26 mm. After the removal of 18 tubes there were obtained channels for the admission of fuel. The fuel particles used were uranium-thorium oxide nuclei having a diameter of 500 microns which were coated with pyrolytic carbon andan intermediate coating of silicon carbide.

The coated particles were encased with the molding powder in a rotating drum according to a kind of dragee process that their weight rose by a factor of 1.8. From the encased fuel particles there were preliminarily moded at about 70° C. and 30 kg/cm² cylinders having a diameter of 25.5 mm. After filling of the 18 channels with fuel cylinders, the entire block was heated to about 150° C. and finally molded at a pressure of about 60 kg/cm². After the molding the matrix density was 1.8 g/m³ at a 35 percent volume fraction of the coated particles in the fuel zone. Subsequently for the purpose of simplicity, there were bored 54 cooling channels in a hexagonal arrangement around the fuel columns.

EXAMPLE 3

Production of Block Elements With Special Binder Pretreatment

The fabrication of the isotropic graphite granules and the preliminary pressing of the block were carried out in the same manner as described in examples 1 and 2 respectively. The graphite matrix powder prepared to overcoated fuel particles was a mixture of 60 weight percent natural graphite powder. Grade FP, 20 weight percent of phenol formaldehyde resin, so for the same mixture as used for fabricating the granulate. However the resin used for overcoating contained 2 weight percent of hexamethylene tetramine as curing agent which in the heating step following after pressing at first leads to a large condensation of this resin and later on to a balanced carbonization shrinkage of the fuel body compared with the surrounding block matrix.

Parallel thereto, under the same production condition, molded cylinders with a particle load in the fuel zone of 35 volume percent were, after final heat treatment, tested for damaged fuel particles. The graphite matrix of the samples was decomposed electrolytically (anode oxidation) and the electrolyte (dilute nitric acid) tested for free uranium. The total amount of uranium found amounted to 13 micrograms. This corresponds to only a third of the amount of uranium of a fuel particle. The result clearly shows that in production according to the invention, the coated particles remain completely uninjured.

What is claimed is:

1. In a process for the production of molded block fuel elements having an isotropic structure and useful in gas cooled high temperature power reactors, said fuel elements comprising fuel-containing and fuel-free zones and a graphite matrix in both the fuel-containing and fuel-free zones including the steps of making a fuel-free block-shaped graphite matrix zone by first molding a graphite and binder containing molding composition, making fuel channels and cooling channels in the graphite matrix, encasing coated fuel particles with a binder containing graphite powder and making prepressed fuel rods by molding said encased coated fuel particles, placing said fuel rods into said fuel channels finally, molding the composite body thus formed and carbonizing said composite body the improvement comprising first producing isotropic graphite granulates of density 1.5 to 1.9 g/cm³ with a porosity of 7.5 to 25 percent by volume and wherein said granulates have an average particle diameter of about 1 mm and each granulate particle contains several hundred thousand isotropically arranged graphite particles by molding in a first molding step from a molding powder having an average grain diameter of about 20 microns and then preliminarily hot molding these isotropic granulates to form said block-shaped fuel-free matrix zone, and afterwards in the final molding step hot molding the composite bodies each consisting of a fuel-free matrix zone with inserted fuel rods at a pressure lower than that applied in said first molding step to form said isotropic fuel elements, the molding powder consisting essentially of a mixture of (A) a binder resin with (B) a member of the group consisting of (1) natural graphite grains, and (2) synthetic graphite grains, and (3) a mixture of both natural and synthetic graphite grains.

2. A process according to claim 1 wherein the granulate is produced at a pressure of about 3 metric tons/cm² at room temperature the fuel-free matrix is preliminarily hot molded at a pressure of about 30kg/cm² and 70° C., the fuel rods are preliminarily hot molded at a pressure of about 30kg/cm²and 70° C. and the composite bodies are finally molded at a pressure of about 60kg/cm² and 150° C.

3. A process according to claim 2 wherein the binder resin is a phenol-formaldehyde resin.

4. A process according to claim 1, wherein the resin is a phenol-formaldehyde resin.

5. A process according to claim 1, wherein the granulates are molded at room temperature.

6. A process according to claim 1, wherein particles smaller than the granulate particles of about 1 mm. are again mixed with a molding powder consisting essentially of a mixture of (A) a binder resin with (B) a member of the group consisting of (1) natural graphite, (2) synthetic graphite and (3) both natural and synthetic graphite and used to make new spheres.

7. A process according to claim 1, wherein the isotropic granulates are formed in the shape of spheres at room temperature from the molding powder and then are reduced to granulates of the stated particle size.

8. A process according to claim 1 wherein the isotropic graphite granulates first produced had a density of 1.5 to 1.85 g/cm$^3$.

9. A process according to claim 1 wherein the isotropic graphite granulates first produced had a density of 1.9 g/cm$^3$.

10. A process according to claim 1 wherein the degree of condensation of the binder in the fuel-containing zones compared to that in the fuel-free zones is increased so that in the carbonizing of the molded product different shrinking and expansion in both zones is avoided.

11. A process according to claim 10 comprising, providing the block fuel element with cooling channels prior to the heat treatment.

* * * * *